United States Patent
Burns

(10) Patent No.: US 8,038,821 B2
(45) Date of Patent: Oct. 18, 2011

(54) PREPARING A PASS-THROUGH FOR AN OCCUPANT COMPARTMENT—ENGINE COMPARTMENT GROUND BLOCK

(75) Inventor: Steven F Burns, Huntertown, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 285 days.

(21) Appl. No.: 12/503,146

(22) Filed: Jul. 15, 2009

(65) Prior Publication Data
US 2011/0011526 A1    Jan. 20, 2011

(51) Int. Cl.
B44C 1/17       (2006.01)
B29C 65/48      (2006.01)
B29C 63/48      (2006.01)
B32B 37/14      (2006.01)
B32B 37/16      (2006.01)
B32B 37/18      (2006.01)
B32B 38/10      (2006.01)

(52) U.S. Cl. ........ 156/233; 156/247; 156/278; 156/280; 156/289; 156/701; 156/234

(58) Field of Classification Search .......... 156/71, 156/230, 233, 234, 247, 278, 280, 289, 701, 156/719
See application file for complete search history.

(56) References Cited

U.S. PATENT DOCUMENTS

| | | | | |
|---|---|---|---|---|
| 5,156,770 A * | 10/1992 | Wetzel et al. | ........ | 252/510 |
| 5,241,836 A * | 9/1993 | Bly | ........ | 62/467 |
| 5,286,952 A * | 2/1994 | McMills et al. | ........ | 219/535 |
| 6,087,996 A * | 7/2000 | Dery | ........ | 343/713 |
| 6,550,942 B1 * | 4/2003 | Zou et al. | ........ | 362/347 |
| 6,709,962 B2 * | 3/2004 | Berg | ........ | 438/599 |
| 6,772,961 B2 * | 8/2004 | Forbes Jones et al. | ........ | 239/79 |
| 2003/0215937 A1 * | 11/2003 | Matson | ........ | 435/287.2 |
| 2004/0057747 A1 * | 3/2004 | Michlin | ........ | 399/106 |
| 2004/0196192 A1 * | 10/2004 | Boyd et al. | ........ | 343/700 MS |

FOREIGN PATENT DOCUMENTS

EP    460586 A  * 12/1991

* cited by examiner

*Primary Examiner* — Philip Tucker
*Assistant Examiner* — Sing P Chan
(74) *Attorney, Agent, or Firm* — Jeffrey P. Calfa; Mark C. Bach

(57) ABSTRACT

A special patch is adhered to the bare metal of a dash panel in covering relation to one or more pass-through holes and their margins before a truck cab is primed and painted. After painting, a cover of the patch is peeled off to expose an electrically conductive medium that remains adhered to the bare metal. A ground block is mounted on the dash panel with a stud passing through a pass-through hole. The electrically conductive medium establishes conductivity of the body of the ground block to the dash panel.

11 Claims, 2 Drawing Sheets

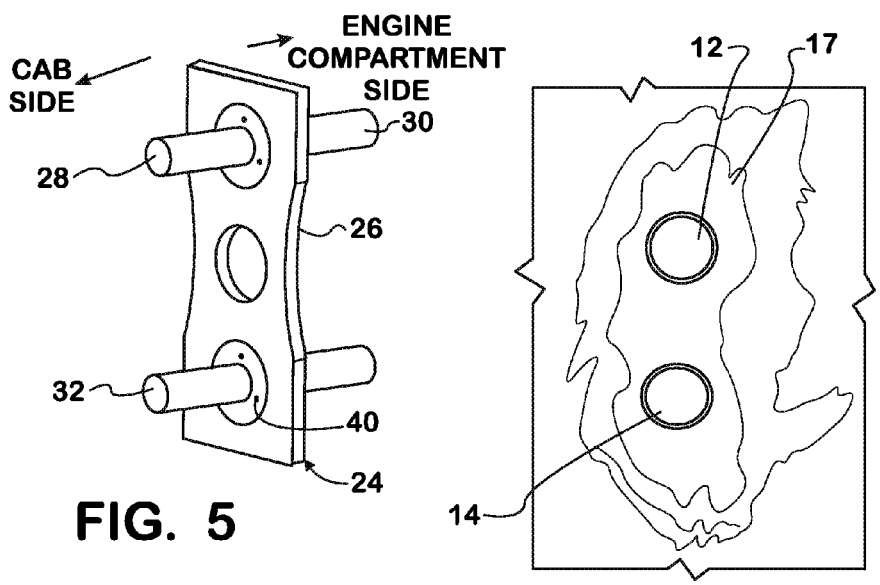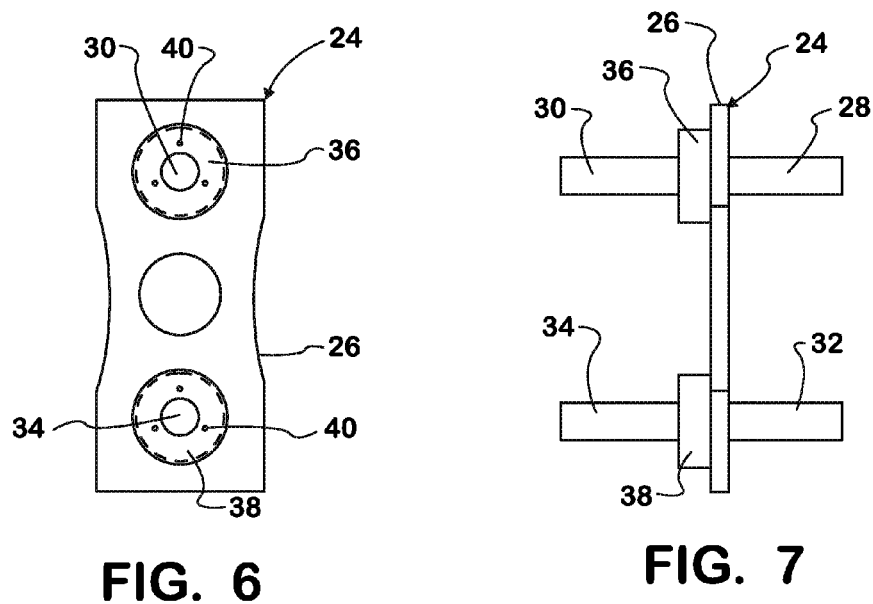

PREPARING A PASS-THROUGH FOR AN OCCUPANT COMPARTMENT—ENGINE COMPARTMENT GROUND BLOCK

FIELD OF THE INVENTION

This invention relates generally to motor vehicle electrical systems, and in particular it relates to the grounding of engine compartment circuits and occupant compartment circuits at a common ground block that mounts on a dash panel separating the two compartments from each other.

BACKGROUND OF THE INVENTION

Structural components of a motor vehicle that are electrical conductors, such as metal of the body and the chassis frame, form the electrical ground for the vehicle's electrical system. Motor vehicles that operate on roads and highways typically have an occupant compartment, where the driver and any passenger or passengers sit, and in front of the occupant compartment, an engine compartment for housing the engine that propels the vehicle. In a large truck, the occupant compartment is commonly called the cab.

A dash panel that is part of a truck cab separates the cab interior from the engine compartment. A known practice for grounding at least some engine compartment circuits and at least some occupant compartment circuits to the vehicle's ground comprises grounding the circuits through a ground block that is mounted on the dash panel at a pass-through.

A typical ground block has a base that is disposed against the dash panel on either the engine compartment side or the cab side and fastened to the dash panel. One or more studs project from the base, either toward the engine compartment or toward the occupant compartment. If the base is disposed against the cab side of the dash panel, one or more studs project through one or more respective holes in the dash panel and into the engine compartment. If the base is disposed against the engine compartment side of the dash panel, the one or more studs project through one or more holes in the dash panel and into the cab interior. The ground block may also comprise one or more studs that project away from a surface of the base that is opposite the surface that is disposed against the dash panel.

The terminal of one or more electrical ground wires or ground cables is located to a stud of the ground block and a nut on the stud is tightened down against the one or more terminals thereby grounding the wires and cables to the ground block. Where studs are present on both engine compartment and cab sides, both cab circuit ground wires or cables and engine circuit ground wires or cables can be connected in common at the ground block.

Because many body panels of a truck cab, like the dash panel, are steel, and because steel is an electrical conductor, the contact between the dash panel and the mounted ground block grounds both engine compartment and cab grounds to the cab body.

Because it is desirable that good electrical contact be established between the ground block and the dash panel, and because certain truck cabs are pre-painted before the ground block is mounted on the dash, it is necessary that the paint and the primer or undercoat be removed from the area of the dash surrounding the pass-through hole, or holes, for a grounding block stud, or studs, before the ground block is mounted.

This stripping of insulated matter from the underlying conductor is typically performed by a mechanical action on an assembly line, such as by applying a wire wheel that is being spun by a power tool to the painted surface to abrade the paint and the primer or undercoat until bare metal is exposed.

That procedure however creates dust and exposes the bare metal to possible rusting. Because it is also difficult to control the amount of paint and undercoat being stripped, the process is to some degree inherently inconsistent from truck to truck.

The inventor believes that the process of assuring good conductivity between the ground block and the dash panel can be greatly improved by using a different process that doesn't involve removal of the paint and undercoat by mechanical abrasion.

SUMMARY OF THE INVENTION

One disclosed embodiment of the inventive process comprises applying a special patch to the bare metal of the dash panel in covering relation to one or more pass-through holes and their margins before the cab is primed and painted. The patch comprises a strippable cover having inner and outer surfaces. The outer perimeter margin of the inner surface contains an adhesive for adhering to the dash panel. Dielectric grease and/or conductive grease is present on a zone of the inner surface of the cover whose perimeter is bounded by the adhesive.

After the cab has been primed and painted, and the paint has dried, primer and paint cover the patch. The edge of a tool is inserted into the paint and primer at the edge of the patch cover and manipulated beneath the margin of the cover sufficiently to enable further manipulation to pry the cover edge away from the dash panel. The edge can then be grasped and the cover peeled off.

While the cover was in place on the dash panel, the grease was in contact with the bare metal surrounding the pass-through hole, or holes. The grease has sufficient tenacity with the bare metal that a layer of grease remains on the bare metal as the cover is being peeled off.

With the patch cover having been removed, the ground block is mounted on the dash panel by aligning one or more of its studs with the one or more pass-through holes in the dash panel and passing the studs through the holes to place the body of the ground block against the residual grease on the dash panel and then fastening the ground block to the dash panel, such as by passing screws through holes in the ground block body and tightening them in holes in the dash panel to force the grease to be squeezed between the ground block and the dash panel. Any excess grease that is squeezed out beyond the base of the ground block can be wiped away if necessary. The grease establishes electrical contact between the ground block and the bare metal of the dash panel.

With the ground block having been mounted and grounded to the cab body at the dash panel, the engine and circuit grounds can be connected to the ground block.

Another disclosed embodiment of the inventive process comprises applying a second type of special patch to the bare metal of the dash panel in covering relation to one or more pass-through holes and their margins before the cab is primed and painted. This second type of patch also comprises a strippable cover having inner and outer surfaces. The entire inner surface of the cover is covered by an electrically conductive pad that adheres the patch to the bare metal of the dash panel, except where the pad has holes for registering with the pass-through holes.

After the cab has been primed and painted, and the paint has dried, the edge of a tool is inserted into the paint and primer at the edge of the patch cover and manipulated beneath the margin of the cover sufficiently to enable further manipulation to pry the cover edge away from the dash panel. The edge can then be grasped and the cover peeled off. The electrically conductive pad has less adherence to the cover than to the bare metal of the dash panel, and so it remains adhered to the dash panel after the cover has been peeled off.

With the cover having been removed, the ground block is mounted on the dash panel by aligning one or more of its studs with the one or more pass-through holes in the dash panel (the holes are not covered by the conductive pad) and passing the studs through the pass-through holes to place the body of the ground block against the conductive pad and then fastening the ground block to the dash panel, such as by passing screws through holes in the ground block body and tightening them in holes in the dash panel to force the conductive pad to be squeezed between the ground block and the dash panel and establish electrical contact between the ground block and the bare metal of the dash panel.

With the ground block having been mounted and grounded to the cab body at the dash panel, the engine and circuit grounds can be connected to the ground block.

Still another embodiment of the inventive process comprises applying a third type of special patch to the bare metal of the dash panel in covering relation to one or more pass-through holes and their margins before the cab is primed and painted. This third type of patch also comprises a strippable cover having inner and outer surfaces. The perimeter margin of the inner surface contains an adhesive for adhering to the dash panel. The dielectric grease and/or conductive grease of the first type of patch is replaced by an electrically conductive pad, or pads, that adhere to the bare metal of the dash panel.

After the cab has been primed and painted, and the paint has dried, the edge of a tool is inserted into the paint and primer at the edge of the patch cover and manipulated beneath the margin of the cover sufficiently to enable further manipulation to pry the cover edge away from the dash panel. The edge can then be grasped and the cover peeled off. The electrically conductive pad, or pads, have less adherence to the cover than they do to the bare metal of the dash panel, and so they remain adhered to the dash panel after the cover has been peeled off.

With the cover having been removed, the ground block is mounted on the dash panel by aligning one or more of its studs with the one or more pass-through holes in the dash panel (the holes are not covered by the conductive pad or pads) and passing the studs through the pass-through holes to place the body of the ground block against the conductive tape and then fastening the ground block to the dash panel, such as by passing screws through holes in the ground block body and tightening them in holes in the dash panel to force the conductive pad or pads to be squeezed between the ground block and the dash panel. The pad or pads establish electrical contact between the ground block and the bare metal of the dash panel.

With the ground block having been mounted and grounded to the cab body at the dash panel, the engine and circuit grounds can be connected to the ground block.

The foregoing, along with further features and advantages of the invention, will be seen in the following disclosure of a presently preferred embodiment of the invention depicting the best mode contemplated at this time for carrying out the invention. This specification includes drawings, now briefly described as follows.

BRIEF DESCRIPTION OF THE DRAWINGS

FIG. 1 is an elevation view of a portion of a truck dash panel at a pass-through.

FIG. 1A is a view similar to FIG. 1 showing a primed and painted dash panel from which the paint and primer have been abraded to expose the underlying bare metal at the pass-through.

FIG. 5 is a perspective view of a ground block that is to be mounted on the dash panel at the pass-through.

FIG. 6 is a front elevation view of the ground block of FIG. 5.

FIG. 7 is a side elevation view of the ground block of FIG. 5.

DESCRIPTION OF THE PREFERRED EMBODIMENT

Figure 1:
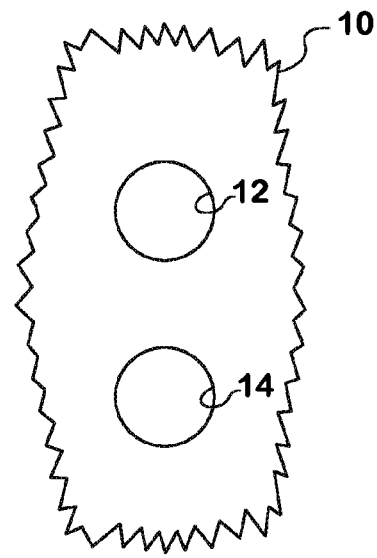

FIG. 1 shows a truck dash panel 10 in which the pass-through comprises two circular holes 12, 14 of equal diameters centered on an imaginary vertical line. Dash panel 10 separates the engine compartment from the interior occupant compartment of the truck cab. FIG. 1A shows another dash panel that had been primed and painted, but with the paint and primer have been abraded to expose the underlying bare metal (reference numeral 17) around the pass-through holes 12, 14. FIG. 1A has been marked "prior art" solely because it is representative of the prior process described earlier. As can be seen, the abrasion process can leave an irregular bare metal area 17.

Figure 2:
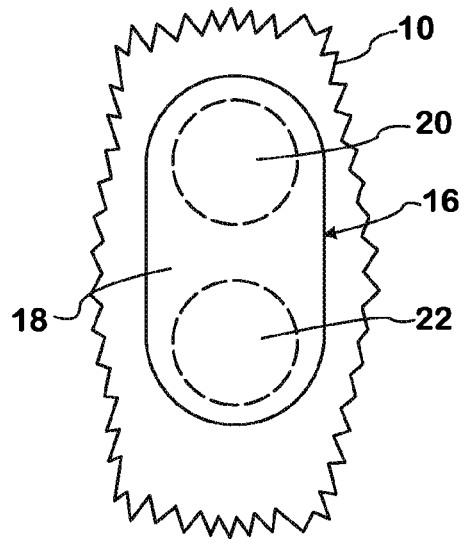
FIG. 2 is a view in the same direction as FIG. 1 showing one embodiment of special patch in place over the pass-through, in accordance with principles of the invention.

FIG. 2 is representative of a special patch 16 having been applied to the bare metal of dash panel 10 in covering relation to holes 12, 14 and their margins before the cab is primed and painted. Patch 16 comprises a strippable cover 18 having inner and outer surfaces. The outer perimeter margin of the inner surface contains an adhesive that adheres patch 16 to the bare metal of dash panel 10. The adhesive bounds a zone of the inner surface of the cover covered by dielectric grease and/or conductive grease. That zone is defined by two circular areas 20, 22.

After the cab has been primed and painted, and the paint has dried, primer and paint are covering the patch. The edge of a tool (not shown) is inserted into the paint and primer at the edge of the patch cover and manipulated beneath the margin of cover 18 sufficiently to enable further manipulation to pry the cover edge away from dash panel 10. The edge can then be grasped and the cover peeled off.

The grease has sufficient tenacity with the bare metal of the dash panel that a layer of grease remains on the bare metal as cover 18 is being peeled off. After the cover has been removed, a ground block 24, shown in FIGS. 5-7, is mounted on dash panel 10.

Ground block 24 comprises a base, or body, 26 and multiple studs 28, 30, 32, 34. Studs 28 and 30 project from opposite faces of a circular disc 36 that is fit to a hole in base 26. Studs 32 and 34 project from opposite faces of a circular disc 38 that is fit to another hole in base 26.

Ground block 24 can be mounted to dash panel 10 on either the engine compartment side or the cab side. Assuming the mounting is on the cab side, studs 30, 34 are aligned with pass-through-holes 12, 14 and passed through the holes to place body 26 against the residual grease on the dash panel.

The ground block is then fastened to the dash panel by passing screws (not shown) through holes 40 in discs 36, 38 and tightening them in holes in the dash panel to force the grease to be squeezed between the ground block and the dash panel. Any excess grease that is squeezed out beyond the base of the ground block can be wiped away if necessary. The grease establishes electrical contact between the ground block and the bare metal of the dash panel. Engine and cab circuit grounds (not shown) can then be placed in association with the respective studs and fastened in placed.

Figure 3:
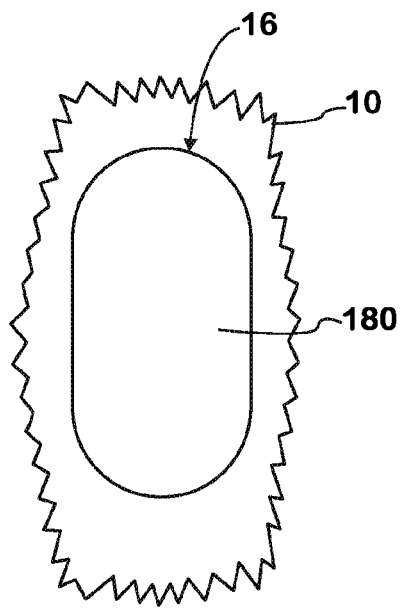
FIG. 3 is a view in the same direction as FIG. 1 showing another embodiment of special patch in place over the pass-through, in accordance with principles of the invention.
Figure 4:
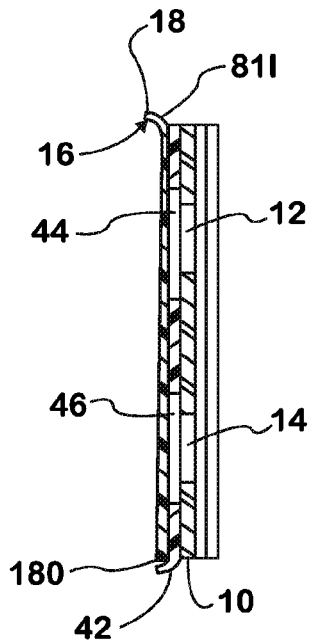
FIG. 4 is a side elevation view partly in cross section through the pass-through with a special patch applied to the dash panel and its cover in the process of being peeled off.

FIGS. 3 and 4 show another embodiment of special patch 16 that has a strippable cover 18 having inner and outer surfaces 18I and 18O. The entirety of inner surface 18I is covered by an electrically conductive pad 42 that adheres the patch to the bare metal of the dash panel, except where the pad has holes 44, 46 for registering with the pass-through holes 12, 14. FIGS. 3 and 4 show patch 16 adhered to the bare metal of dash panel 10 by adhesive on pad 42.

To remove cover 18, a tool (not shown) is manipulated beneath the margin of the cover sufficiently to enable further manipulation to pry the cover edge away from the dash panel, as shown at the top of FIG. 4. The edge can then be grasped and the cover peeled completely off. The electrically conductive pad 42 is adhered to the dash panel with greater adherence than that of the cover to the pad, allowing the cover to be peeled off while leaving the pad adhered to the dash panel.

With the cover having been removed, the ground block is mounted on the dash panel is the same way as previously described force the conductive pad to be squeezed between the ground block and the dash panel and establish electrical contact between the ground block and the bare metal of the dash panel.

Still another embodiment comprises applying a third type of special patch to the bare metal of the dash panel in covering relation to one or more pass-through holes and their margins before the cab is primed and painted. This third type of patch also comprises a strippable cover having inner and outer surfaces. The perimeter margin of the inner surface contains an adhesive for adhering to the dash panel. The dielectric grease and/or conductive grease in the two circular areas 20, 22 in FIG. 2 are replaced by electrically conductive pads that adhere to the bare metal of the dash panel around margins of the pass-through holes.

To remove the cover, the edge of a tool (not shown) is inserted into the dried paint and primer at the edge of the patch cover and manipulated beneath the margin of the cover sufficiently to enable further manipulation to pry the cover edge away from the dash panel. The edge can then be grasped and the cover peeled off. The electrically conductive pads have less adherence to the cover than they do to the bare metal of the dash panel, and so they remain adhered to the dash panel after the cover has been peeled off.

With the cover having been removed, the ground block is mounted on the dash panel as described above.

While using an adhesive patch or cover to protect an area of a truck cab from paint is known, the invention is specific to mounting a ground block on a structural panel by including an electrically conductive medium in the patch in order to avoid having to mechanically remove the dried primer and paint in a first step and thereafter apply dielectric or conductive grease in a second step.

While a presently preferred embodiment of the invention has been illustrated and described, it should be appreciated that principles of the invention apply to all embodiments falling within the scope of the following claims.

What is claimed is:

1. A method for preparing a pass-through in an electrically conductive structural panel of a motor vehicle that separates an engine compartment from an occupant compartment for subsequent mounting of a ground block on the panel to provide a ground to which engine compartment circuits of an electrical system of the vehicle can be connected and to which occupant compartment circuits of the electrical system can be connected, the method comprising:

adhering a patch to bare metal of the panel in covering relation to one or more pass-through holes in the panel prior to applying one or more electrically non-conductive coatings to the panel; and after the one or more coatings have been applied and dried, removing an outer cover of the patch to expose an electrically conductive medium of the patch that remains in covering relation to bare metal forming a margin of the one or more through-holes.

2. The method as set forth in claim 1 wherein the step of adhering the patch to bare metal of the panel in covering relation to one or more pass-through-holes comprises adhering a portion of the cover to the bare metal.

3. The method as set forth in claim 2 wherein the step of adhering the patch to bare metal of the panel in covering relation to one or more pass-through-holes comprises adhering also includes adhering the electrically conductive medium.

4. The method as set forth in claim 1 wherein the step of adhering the patch to bare metal of the panel in covering relation to one or more pass-through-holes comprises adhering the electrically conductive medium to the bare metal of the panel; after adhering the electrically conductive medium, adhering the patch in a covering position over the electrically conductive medium onto bare metal of the panel.

5. The method as set forth in claim 1 further including the step of mounting a ground block on the dash panel by passing a stud of the ground block through a pass-through hole, disposing a body of the ground block against the exposed electrically conductive medium, and fastening the ground block to the dash panel.

6. A method for preparing a pass-through in an electrically conductive structural panel of a motor vehicle that separates an engine compartment from an occupant compartment for subsequent mounting of a ground block on the panel to provide a ground to which engine compartment circuits of an electrical system of the vehicle can be connected and to which occupant compartment circuits of the electrical system can be connected, the method comprising:

adhering an outer margin of a patch cover to bare metal of the panel, wherein an electrically conductive medium bounded by the outer margin of the patch cover is placed in covering relation to at least a portion of the margin of the one or more pass-through holes;

applying one or more electrically non-conductive coatings to the panel; and after the one or more coatings have been applied and dried, removing the patch cover to expose the electrically conductive medium.

7. The method as set forth in claim 6 further including the step of mounting a ground block on the dash panel by passing a stud of the ground block through a pass-through hole, disposing a body of the ground block against the exposed electrically conductive medium, and fastening the ground block to the dash panel.

8. A method for preparing a pass-through in an electrically conductive structural panel of a motor vehicle that separates an engine compartment from an occupant compartment for subsequent mounting of a ground block on the panel to provide a ground to which engine compartment circuits of an electrical system of the vehicle can be connected and to which occupant compartment circuits of the electrical system can be connected, the method comprising:
- adhering at least one electrically conductive pad on the inner surface of a patch cover;
- adhering the at least one electrically conductive pad and the patch cover to bare metal of the panel forming a margin of one or more pass-through holes in the panel prior to applying one or more electrically non-conductive coatings to the panel; and
- after the one or more coatings have been applied and dried, removing the patch cover to expose the at least one electrically conductive pad.

9. The method as set forth in claim 8 further including the step of mounting a ground block on the dash panel by passing a stud of the ground block through a pass-through hole, disposing a body of the ground block against the exposed electrically conductive medium, and fastening the ground block to the dash panel.

10. The method as set forth in claim 8 including adhering a portion of the cover to bare metal of the panel.

11. The method as set forth in claim 10 further including the step of mounting a ground block on the dash panel by passing a stud of the ground block through a pass-through hole, disposing a body of the ground block against the exposed electrically conductive medium, and fastening the ground block to the dash panel.

\* \* \* \* \*